United States Patent
Mahajan et al.

(10) Patent No.: US 12,124,828 B2
(45) Date of Patent: Oct. 22, 2024

(54) SOURCE CODE VALIDATION BASED ON CONVERTING THE SOURCE CODE TO A NON-PROGRAMMING LANGUAGE

(71) Applicant: Bank of America Corporation, Charlotte, NC (US)

(72) Inventors: Nipun Mahajan, Lawrenceville, NJ (US); Amit Mishra, Chennai (IN); Yaksh Kumar Singh, Uttar Pradesh (IN); Yogesh Raghuvanshi, Princeton, NJ (US); Pravin Kumar Sankari Bhagavathiappan, Kanyakumari District (IN)

(73) Assignee: Bank of America Corporation, Charlotte, NC (US)

( * ) Notice: Subject to any disclaimer, the term of this patent is extended or adjusted under 35 U.S.C. 154(b) by 164 days.

(21) Appl. No.: 18/156,004

(22) Filed: Jan. 18, 2023

(65) Prior Publication Data
US 2024/0241705 A1      Jul. 18, 2024

(51) Int. Cl.
G06F 8/51         (2018.01)
G06F 8/41         (2018.01)

(52) U.S. Cl.
CPC . *G06F 8/51* (2013.01); *G06F 8/42* (2013.01)

(58) Field of Classification Search
None
See application file for complete search history.

(56) References Cited

U.S. PATENT DOCUMENTS

| | | |
|---|---|---|
| 5,842,204 A | 11/1998 | Andrews et al. |
| 6,698,014 B1 * | 2/2004 | Rechter .................... G06F 8/76 717/137 |
| 7,058,699 B1 | 6/2006 | Chiou et al. |
| 7,236,486 B2 | 6/2007 | Baker et al. |
| 7,467,375 B2 | 12/2008 | Tondreau et al. |
| 7,765,097 B1 | 7/2010 | Yu et al. |
| 7,987,490 B2 | 7/2011 | Ansari et al. |
| 8,161,172 B2 | 4/2012 | Reisman |

(Continued)

FOREIGN PATENT DOCUMENTS

WO         2014086101 A1      12/2013

OTHER PUBLICATIONS

Nipun Mahajan et al., U.S. Appl. No. 18/155,939, filed Jan. 18, 2023, "Source code conversion from an original computer programming language to a target programming language."

*Primary Examiner* — Qing Chen

(57) ABSTRACT

A system identifies data objects from a first piece of code in an original programming language and creates a knowledge graph that represents a relationship among the data objects. The system identifies an expression syntax in the first piece of code and determines an interpretation of the expression syntax. The system creates a sentence that indicates an interpretation of a respective code line. The system determines a counterpart data object in a target programming language for each word in the created sentence. In response, the system creates a second piece of code in the target programming language, such that the second price of code satisfies syntax rules in the target programming language. In response to determining that the second piece of code is configured to perform a particular task that the first piece of code is configured to, the system executes the second piece of code.

20 Claims, 5 Drawing Sheets

(56) References Cited

U.S. PATENT DOCUMENTS

| | | | |
|---|---|---|---|
| 8,341,270 B2 | 12/2012 | Mazzaferri et al. | |
| 8,484,218 B2 | 7/2013 | Raghunath | |
| 8,706,394 B2 | 4/2014 | Trepagnier et al. | |
| 8,712,920 B2 | 4/2014 | Walker et al. | |
| 8,762,962 B2 | 6/2014 | Ben-Artzi et al. | |
| 8,914,652 B1 | 12/2014 | Conway | |
| 9,130,379 B2 | 9/2015 | Sakabe et al. | |
| 9,483,295 B2 | 11/2016 | Gschwind | |
| 9,484,077 B2 | 11/2016 | Reisman | |
| 9,870,210 B2 | 1/2018 | Gschwind et al. | |
| 2004/0103405 A1 | 5/2004 | Vargas | |
| 2014/0086101 A1 | 3/2014 | Barkan | |
| 2014/0157243 A1* | 6/2014 | Vargas | G06F 8/51 717/137 |
| 2015/0020051 A1* | 1/2015 | Rabinovitch | G06F 8/51 717/124 |
| 2015/0242194 A1* | 8/2015 | Vargas | G06F 8/51 717/137 |

\* cited by examiner

SOURCE CODE VALIDATION BASED ON CONVERTING THE SOURCE CODE TO A NON-PROGRAMMING LANGUAGE

TECHNICAL FIELD

The present disclosure relates generally to network security, and more specifically to source code validation based on converting the source code to a non-programming language.

BACKGROUND

Organizations may subscribe to software solution providers. The software solution providers may provide source code to the organizations. The software solution providers may sunset the existing version of the source code and provide a new version of the source code to the organizations. The new version of the source code may be in a new programming language and/or may not be compatible with the existing software infrastructure of the organizations.

SUMMARY

The system described in the present disclosure is particularly integrated into practical applications of improving code validation techniques when source code is converted or updated from an original programming language to a target programming language. This, in turn, improves the reliability and accuracy of the source code when executed. For example, upon validating that the updated source code is correct and is configured to perform the expected function before executing the updated source code, the underlying reliability and accuracy of the source code are improved. These practical applications lead to the technical advantage of improving the underlying operation of the source code.
Updating Source Code from an Original Programming Language to a Target Programming Language The disclosed system contemplates a system and method for updating source code from an original programming language to a target programming language. In an example scenario, entities may roll out (i.e., provide) a new version or updated version of source code to their subscribers (e.g., an organization) and retire the existing version of the source code. The updated source code may not be compatible with the existing software infrastructure stack used by the organization. For example, the existing version of the source code may be written in an original programming language (e.g., Java, or the like), and the updated version of the source code may be written in another programming language (e.g., C++ or the like). The existing software infrastructure stack may be previously implemented by the organization to be compatible with the existing (and previous) version of the source code. The process of migrating from the existing version of the source code to the new version is computationally complex and requires a large amount of processing and memory resources and expertise. For example, in this process, several components of the existing software infrastructure stack may need to be revised or updated to be compatible with the new version of the source code. One approach to using the new version of the source code may be to use conversion library functions to link the existing software infrastructure stack (in the existing programming language) with the new version of the source code (in another programming language). However, this approach consumes excess amounts of processing and memory resources to be able to link software resources from one programming language to software resources in another programming language.

The disclosed system contemplates unconventional methods to update the existing version of the source code (that is written in an original programming language) to the new version of the source code (that is written in a target programming language) and to validate the new version of the source code. Therefore, the new version of the source code and the existing software infrastructure stack may be implemented by the same programming language as one another. Thus, the disclosed system provides a practical application of reducing amounts of processing and memory resources allocated to implement the new version of the source code and integrate it with the existing software infrastructure stack, that would otherwise be used if the source code and the existing software infrastructure stack are implemented in different programming languages.

In certain embodiments, the disclosed system may be configured to update the existing version of the source code to the new version of the source code by generating a knowledge graph of the source code, where the knowledge graph indicates data objects of the source code, their attributes, and relationships to each other, identifying data objects that are unique to the original programming language, masking the identified data objects, predicting (via a natural language processing (NLP) machine learning module) a counterpart data objects for each identified data object used in the target programming language, and creating the new version of the source code in the target programming language.

In certain embodiments, the disclosed system may be configured to validate the new version of the source code that is determined according to certain embodiments described herein. In this process, the disclosed system may validate the new version of the source code by generating a second knowledge graph from the new version of the source code, where the second knowledge graph indicates data objects of the code, their attributes, and relationships to each other, comparing the first knowledge graph (associated with the source code in the original programming language) with the second knowledge graph (associated with the source code in the target language), and determining whether the first knowledge graph corresponds to the second knowledge graph. The knowledge graph may represent the logic and task flow of the code, and therefore may be the same across different programming languages. If it is determined that the first knowledge graph corresponds to the second knowledge graph, the disclosed system determines that the new version of the source code is valid. To further verify that the logic and task flow of the new version of the source code is as expected, the disclosed system may execute multiple test cases using the new version of the source code. The disclosed system may compare the result of the test cases with the expected results. If the test case results correspond to the expected results, the disclosed system may confirm that the logic and task flow of the new version of the source code is expected and accurate.

In response, the disclosed system may execute the new version of the source code and integrate the new version of the source code into the existing software infrastructure stack. In this manner, the disclosed system improves the reliability and accuracy of the source code. The disclosed system also reduces the computation complexity that comes with integrating the new version of the source code with the existing software infrastructure stack, e.g., by converting the source code into the target programming language that the other components of the existing software infrastructure stack are written in and/or compatible with.

Furthermore, the disclosed system reduces the processing and memory resources that are used to migrate from the existing version of the source code to the new version of the source code. For example, the disclosed system may convert the original source code into a compressed low-dimension vector before creating the new version of the source code. The compressed low-dimension vector may occupy less memory space and require fewer processing resources to be analyzed.

In certain embodiments, a system for updating source code from an original programming language to a target programming language comprises a memory operably coupled to a processor. The memory is configured to store a first piece of code written in an original programming language, wherein the first piece of code is programmed to perform a particular task. The memory is further configured to store a set of particular keywords that are unique to the original programming language and are not used in other programming languages. The memory is further configured to store a mapping table that comprises the set of particular keywords and a set of counterpart keywords, wherein each of the set of particular keywords is mapped to a counterpart keyword from among the set of counterpart keywords, wherein the set of counterpart keywords is unique to the target programming language. The processor is configured to identify a set of data objects from the first piece of code, the set of data objects comprising at least one of a name of a function, a type of the function, an input parameter to the function, a type of the input parameter, an output parameter of the function, or a type of the output parameter. The processor is further configured to create a first knowledge graph that represents a relationship among the set of data objects, wherein the first knowledge graph is created based at least in part upon a position of each data object from among the set of data objects with respect to positions of other data objects in the first piece of code. The processor is further configured to identify a particular data object, from among the set of data objects, that is unique to the original programming language in response to determining that the particular data object is among the set of particular keywords, wherein the particular data object is used for a particular purpose in the original programming language. The processor is further configured to determine, based at least in part upon the determined purpose of the particular data object, a counterpart data object to the particular data object in the mapping table, wherein the counterpart data object is used for the particular purpose in the target programming language. The processor is further configured to create, based at least in part upon the first knowledge graph, a second piece of code in the target programming language by replacing the particular data object with the counterpart data object and maintaining the rest of data objects from the first piece of code. The processor is further configured to determine that the second piece of code is configured to perform the particular task. In response to determining that the second piece of code is configured to perform the particular task, the processor is further configured to execute the second piece of code.

Verifying Source Code by Converting the Source Code into a Non-Programming Language The disclosed system contemplates a system and method for verifying source code by converting the source code into a non-programming language. In the example scenario described above, when original source code is received from an entity, the disclosed system may update the existing version of the source code to the new version of the source code by converting the source code to text in a non-programming language and converting the text written in non-programming language to a piece of code in the target programming language. The disclosed system may perform similar operations to verify the new version of the source code by comparing the knowledge graphs associated with the source code in the original programming language and the source code in the target programming language, similar to that described above. Furthermore, the disclosed system may be configured to verify whether the translation of the source code to a non-programming language is accurate by determining whether the knowledge graphs associated with the source code in the original programming language and the source code in the target programming language correspond to one another.

In certain embodiments, a system for validating source code by converting the source code into a non-programming language comprises a memory operably coupled to a processor. The memory is configured to store a first piece of code written in an original programming language, wherein the first piece of code is programmed to perform a particular task. The memory is further configured to store an expression-to-text map that comprises a plurality of expression syntaxes mapped to respective text, wherein the respective text indicates an interpretation of the plurality of expression syntaxes. The memory is further configured to store a syntax rule associated with a target programming language, wherein the syntax rule indicates how data objects should be assembled to satisfy the syntax rule. The processor is configured to identify a set of data objects from the first piece of code, the set of data objects comprising at least one of a name of a function, a type of the function, an input parameter to the function, a type of the input parameter, an output parameter of the function, or a type of the output parameter. The processor is further configured to create a first knowledge graph that represents a relationship among the set of data objects, wherein the first knowledge graph is created based at least in part upon a position of each data object from among the set of data objects with respect to positions of other data objects in the first piece of code. The processor is further configured to identify an expression syntax from the first piece of code. The processor is further configured to determine an interpretation of identified expression syntax in response to identifying that the identified expression syntax is among the plurality of expression syntaxes in the expression-to-text map, wherein the respective text indicates the interpretation of the identified expression syntax. The processor is further configured to create, based at least in part upon the first knowledge graph and the interpretation of the identified expression syntax, a sentence for at least one line of the first piece of code, wherein the sentence indicates an interpretation of the at least one line of the first piece of code. The processor is further configured to determine, for a plurality of words in the created sentence, a plurality of counterpart data objects in the target programming language, wherein each of the plurality of counterpart data objects is determined for a particular word in the plurality of words. The processor is further configured to create a second piece of code in the target programming language based at least in part upon the determined plurality of counterpart data objects and the syntax rule, such that the created second price of code satisfies the syntax rule. The processor is further configured to determine that the second piece of code is configured to perform the particular task. The processor is further configured to execute the second piece of code in response to determining that the second piece of code is configured to perform the particular task.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to update source code from an original programming language to a target programming language and verify whether the source code update was accurate. Embodiments of the present disclosure and its advantages may be understood by referring to FIGS. 1 through 5. FIGS. 1 through 5 are used to describe systems and methods to update source code from an original programming language to a target programming language and verify whether the source code update was accurate.

System Overview

Figure 1:
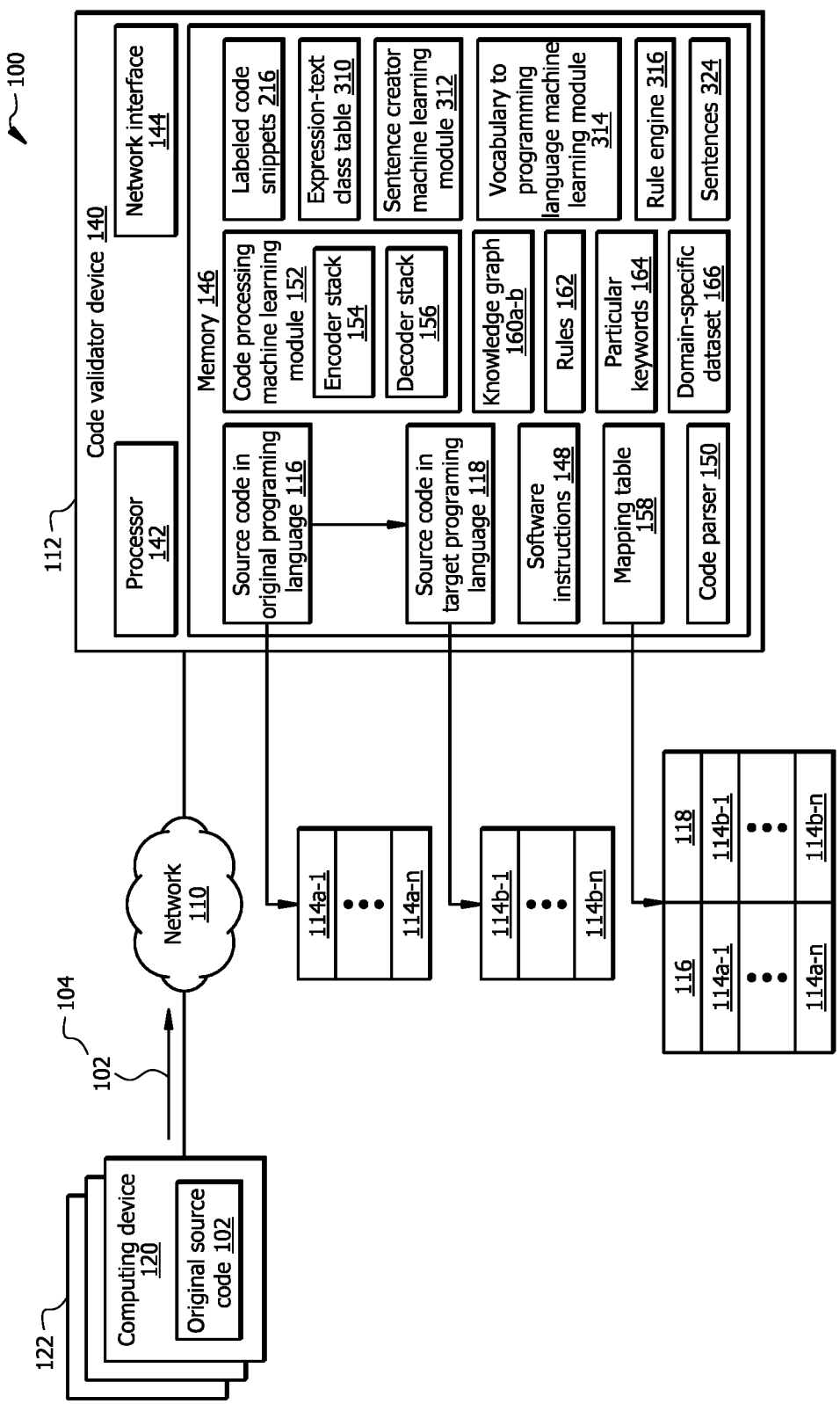
FIG. 1 illustrates an embodiment of a system configured to update source code from an original programming language to a target programming language and verify source code by converting the source code into a non-programming language.

FIG. 1 illustrates an embodiment of a system 100 that is generally configured to update source code 102 from an original programming language to a target programming language and verify whether the source code update was accurate. In other words, the system 100 may be configured to determine whether the updated source code 102b is configured to perform a particular task 104 that the initial source code 102a is programmed to perform. In response to determining that the updated source code 102b is configured to perform the particular task 104, the system 100 may execute the updated source code 102b. In certain embodiments, the system 100 comprises a code validator device 140 communicatively coupled with one or more computing devices 120 via a network 110. Network 110 enables the communication among the components of the system 100. The entities 120 may provide source code 102 to the code validator device 140. The code validator device 140 comprises a processor 142 in signal communication with a memory 146. Memory 146 stores software instructions 148 that when executed by the processor 142, cause the processor 412 (and the code validator device 140) to perform one or more operations described herein. In other embodiments, system 100 may not have all of the components listed and/or may have other elements instead of, or in addition to, those listed above.

In general, the system 100 improves code conversion, code update, and code validation techniques. The entities 120 may roll out (i.e., provide) a new version or updated version of source code 102 to their subscribers (e.g., an organization 112) and retire the existing version of the source code 102. The updated source code 102 may not be compatible with the existing software infrastructure stack used by the organization 112. For example, the existing version of the source code 102 may be written in an original programming language (e.g., Java, or the like), and the updated version of the source code 102 may be written in another programming language (e.g., C++ or the like). The existing software infrastructure stack may be previously implemented by the organization 112 to be compatible with the existing (and previous) version of the source code 102. The process of migrating from the existing version of the source code 102 to the new version is computationally complex and requires a large amount of processing and memory resources and expertise. For example, in this process, several components of the existing software infrastructure stack may need to be revised or updated to be compatible with the new version of the source code. One approach to use the new version of the source code may be to use conversion library functions to link the existing software infrastructure stack (in the existing programming language) with the new version of the source code (in another programming language). However, this approach consumes excess amounts of processing and memory resources to be able to link software resources from one programming language to software resources in another programming language.

The system 100 contemplates unconventional methods to update the existing version of the source code 102a (that is written in an original programming language) to the new version of the source code 102b (that is written in a target programming language) and to validate the new version of the source code 102b. Therefore, the new version of the source code and the existing software infrastructure stack may be implemented by the same programming language as one another. Thus, the system 100 provides a practical application of reducing amounts of processing and memory resources allocated to implement the new version of the source code and integrate it with the existing software infrastructure stack, that would otherwise be used if the source code and the existing software infrastructure stack are implemented in different programming languages.

In certain embodiments, the system 100 may be configured to update the existing version of the source code 102a to the new version of the source code 102b by generating a knowledge graph 160a of the source code 102a, where the knowledge graph 160a indicates data objects of the source code 102a, their attributes, and relationships to each other, identifying data objects that are unique to the original programming language, masking the identified data objects, predicting (via a natural language processing (NLP) machine learning module) a counterpart data objects for each identified data object used in the target programming language, and creating the new version of the source code 102b in the target programming language. This operation is described in greater detail in the discussion of FIGS. 2-3.

In certain embodiments, the system 100 may be configured to update the existing version of the source code 102a to the new version of the source code 102b by converting the source code 102a to text in a non-programming language, converting the text written in non-programming language to a piece of code 102b in the target programming language. This operation is described in greater detail in the discussion of FIGS. 4-5.

In certain embodiments, the system 100 may be configured to validate the new version of the source code 102b that is determined according to certain embodiments described herein. In this processor, the system 100 may validate the new version of the source code 102b by generating a second knowledge graph 160b from the new version of the source code 102b, where the second knowledge graph 160b indicates data objects of the code 102b, their attributes, and relationships to each other, comparing the first knowledge graph 160a (associated with the source code 102a in the original programming language) with the second knowledge graph 160b (associated with the source code 102b in the target language), and determining whether the first knowledge graph 160a corresponds to the second knowledge graph 160. The knowledge graph 160a,b may represent the logic and task flow of the code 102a,b, respectively, and therefore may be the same across different programming languages. If it is determined that the first knowledge graph 160a corresponds to the second knowledge graph 1160a, the system 100 determines that the new version of the source code 102b is valid.

To further verify that the logic and task flow of the new version of the source code 102b are as expected, the system 100 may execute multiple test cases using the new version of the source code 102b. The system 100 may compare the result of the test cases with the expected results. If the test case results correspond to the expected results, the system 100 may confirm that the logic and task flow of the new version of the source code 102b are expected and accurate. In response, the system 100 may execute the new version of the source code 102b and integrate the new version of the source code 102b into the existing software infrastructure stack. The system 100 reduces the processing and memory resources that are used to migrate from the existing version of the source code 102a to the new version of the source code 102b. For example, the system 100 may convert the original source code 102a into a compressed low-dimension vector before creating the new version of the source code 102b. The compressed low-dimension vector may occupy less memory space and require fewer processing resources to be analyzed.

System Components
Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

Each computing device 120 is generally any device that is configured to process data and interact with users. Examples of the computing device 120 include, but are not limited to, a personal computer, a desktop computer, a workstation, a server, a laptop, a tablet computer, a mobile phone (such as a smartphone), an Internet-of-Things (IoT) device, or any other suitable type of device. The computing device 120 may include a user interface, such as a display, a microphone, a camera, keypad, or other appropriate terminal equipment usable by a user. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110. The computing device 120 may be associated with an entity 120.

Each entity 120 may be an organization or individual that provides software and/or hardware resources to its subscribers (e.g., organization 112). For example, an entity 120 may provide source code 102a to the organization 112 via the computing device 120 and network 110. The source code 102a may include multiple code lines, multiple files, multiple libraries, and any other data that is needed to facilitate the execution of the source code 102a. The source code 102a may be programmed to perform a particular task 104. Examples of the particular task 104 may include creating new client profiles, updating a particular web application, updating a particular mobile application, updating a particular software application, executing a particular web application, executing a particular mobile application, and executing a particular software application, among others.

Code Validator Device

Code validator device 140 generally includes a hardware computer system configured to update source code 102a from an original programming language to a target programming language and validate the source code in the target programming language. In certain embodiments, the code validator device 140 may be implemented by a cluster of computing devices, such as virtual machines. For example, the code validator device 140 may be implemented by a plurality of computing devices using distributed computing and/or cloud computing systems in a network. In certain embodiments, the code validator device 140 may be configured to provide services and resources (e.g., data and/or hardware resources) for the components of the system 100. The code validator device 140 may be associated with the organization 112. The organization 112 may provide services and/or products to its subscribers.

The code validator device 140 comprises a processor 142 operably coupled with a network interface 144 and a memory 146. Processor 142 comprises one or more processors. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the code validator device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-5. For example, the processor 142 may be configured to perform one or more operations of the operational flow 200 as described in FIG. 2, one or more operations of method 300 as described in FIG. 3, one or more operations of the operational flow 400 as described in FIG. 4, and one or more operations of method 500 as described in FIG. 5.

Network interface 144 is configured to enable wired and/or wireless communications. The network interface 144 may be configured to communicate data between the code validator device 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, cloud database, network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-5 along with any other data, instructions, logic, rules, or code operable to implement the function(s) described herein when executed by processor 142. For example, the memory 146 may store software instructions 148, source code 102*a* in the original programming language 116, source code 102*b* in the target programming language 118, mapping table 159, knowledge graphs 160*a,b*, code parser 150, keywords 164, code processing machine learning module 152, labeled code snippets 216, rules 162, domain-specific dataset 166, expression-text class 310, sentence creator machine learning module 312, vocabulary to programming language machine learning module 314, rule engine 316, sentences 324, and/or any other data or instructions. The software instructions 148 may comprise any suitable set of instructions, logic, rules, or code operable to execute the processor 142 and perform the functions described herein, such as some or all of those described in FIGS. 1-5.

Figure 2:
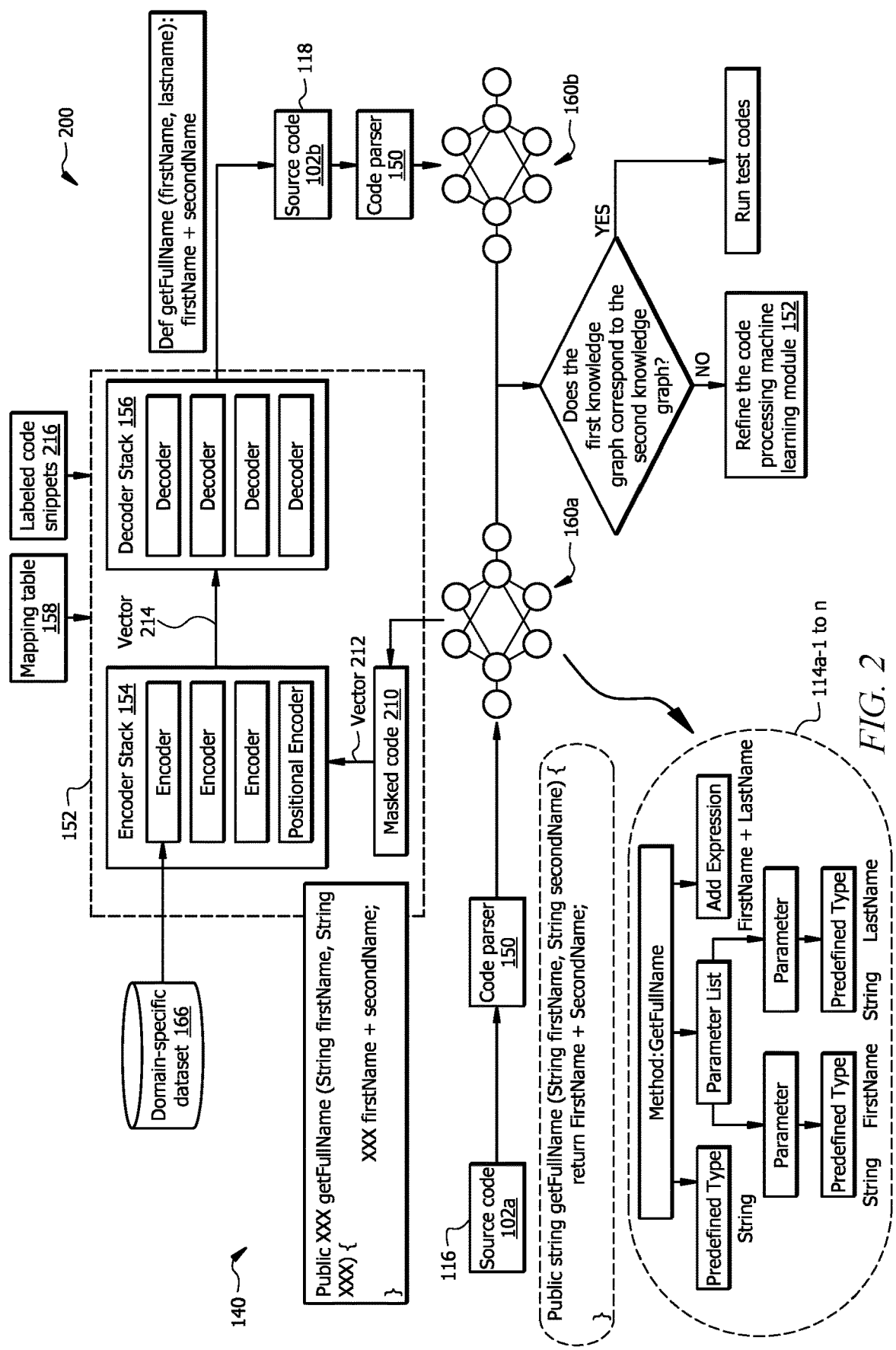
FIG. 2 illustrates an example operational flow of the system of FIG. 1 for updating source code from an original programming language to a target programming language.

Code parser 150 may be implemented by the processor 142 executing the software instructions 148, and is generally configured to parse the source code 102, identify data objects 114*a,b* of the source code 102*a,b*, and generate a knowledge graph 160*a,b* that represents the logic, the relationship between the data objects 114*a,b*, and the task flow of the source code 102*a,b*, respectively (see example knowledge graph 160*a,b* in FIG. 2). In certain embodiments, the code parser 150 may be a rule-based engine, such that the code parser 150 may follow a set of rules 162 to perform its functions. For example, a rule 162 may indicate if data object 114 is positioned right after a name of a function in the source code 102, it is determined that the data object 114 is an input parameter to the function. In another example, a rule 162 may indicate if a data object 114 is a first keyword (or word) in the function line, it is determined that the data object 114 indicates a type or category of the function. Examples of the set of data objects 114 may include a name of a function, a type of the function, an input parameter to the function, a type of the input parameter, an output parameter of the function, a type of the output parameter, among other data objects that can be used in source code 102. In certain embodiments, the code parser 150 may be implemented by an object-oriented programming and treat each word, symbol, and number in the source code 102 as a data object 114.

Code processing machine learning module 152 may be implemented by the processor 142 executing the software instructions 148, and is generally configured to identify data objects 114 in the source code 102 that are unique to the original programming language 116, mask the identified data objects 114 (see FIG. 2 for the example of masked code 210), and convert the masked code into a vector that represents the attributes and features of the masked code in numerical format.

In certain embodiments, the code processing machine learning module 152 may include a support vector machine, neural network, random forest, k-means clustering, Tree-based algorithm, Random Forest algorithm, etc. In certain embodiments, the code processing machine learning module 152 may include text processing, NLP algorithms, and the like. In certain embodiments, the code processing machine learning module 152 may be implemented by a plurality of neural network layers, convolutional neural network layers, Long-Short-Term-Memory (LSTM) layers, Bi-directional LSTM layers, recurrent neural network layers, and the like. The code processing machine learning module 152 may be implemented by supervised, semi-supervised, or unsupervised training algorithms. In certain embodiments, the code processing machine learning module 152 may perform word segmentation, sentence segmentation, word tokenization, sentence tokenization, sentiment analysis, and/or the like to process and analyze each data object 114 of the source code 102. In certain embodiments, the code processing machine learning module 152 may be configured to determine the logic and task flow of the source code 102.

The code processing machine learning module 152 may be given a list of particular keywords 164 that are unique to the original programming language 116—and the keywords 164 are not used in other programming languages. The code processing machine learning module 152 may also be given a price of the source code 102 and asked to identify data objects 114 in the source code 102 that are unique to the original programming language 116.

The code processing machine learning module 152 may perform the following operations for each keyword 164 and each data object 114. The code processing machine learning module 152 may extract a first set of features from a particular keyword 164. The first set of features may indicate an interpretation and purpose of the particular keyword 164. The first set of features may be represented in a first feature vector of numerical values. The code processing machine learning module 152 may extract a second set of features from a data object 114. The second set of features may indicate an interpretation and purpose of the data object 114. The second set of features may be represented in a second feature vector of numerical values. The code processing machine learning module 152 may compare the first feature vector to the second feature vector. The code processing machine learning module 152 may determine a distance (e.g., Euclidean distance) between the first feature vector to the second feature vector. The code processing machine learning module 152 may compare the determined Euclidean distance with a threshold distance (e.g., 0.1, 0.2, 0.01, etc.). If it is determined that the Euclidean distance is less than the threshold distance, the code processing machine learning module 152 may determine that the data object 114 corresponds to the keyword 164. Otherwise, the code processing machine learning module 152 may determine that the data object 114 does not correspond to the keyword 164. The code processing machine learning module 152 may perform similar operations to evaluate each data object 114 against each keyword 164 to determine whether the a data object 114 is among the particular keywords 164.

The code processing machine learning module 152 may be trained, tested, and refined with labeled sample code and keywords 164 as a part of a training dataset. The code processing machine learning module 152 may perform similar operations on unlabeled code and keywords and compare the prediction results in the testing stage with the prediction results in the training stage.

A user may provide feedback on the performance of the code processing machine learning module 152. The code processing machine learning module 152 may use the user feedback to increase its prediction. In the refining stage and back propagation process, the weight and bias values of the neural networks of the code processing machine learning module 152 may be updated to increase the accuracy of the prediction of the code processing machine learning module 152.

The code processing machine learning module 152 may generate three embeddings, including token embedding, segment embedding, and position embedding from the source code 102. The code processing machine learning module 152 may generate a token embedding that represents each word in the source code 102. The segment embedding may be a vector used to distinguish different sentences in the source code 102. The position embedding may be a vector that provides information about a position of each word in a sentence. The code processing machine learning module 152 may aggregate these vectors into one vector to be used by the encoder stack.

The code processing machine learning module 152 may include an encoder stack 154 and a decoder stack 156. The encoder stack 154 may include multiple encoders 154. Each encoder 154 may include neural networks comprising a self-attention layer and a feed-forward neural network. Each encoder 154 may be configured to detect the context of each line of the source code 102 bidirectionally. The encoder stack 154 may be configured to predict the masked portions (e.g., masked data objects 114a) of the source code 102 as indicated in the masked code (210 in FIG. 2) and the counterpart data objects 114b to replace with the masked portions. In this process, the encoder stack 154 may access the mapping table 158 and use it to determine the counterpart data objects 114b that are mapped to the masked data objects 114a.

The encoder stack 154 may perform the following operations for each data object 114a (e.g., any of data objects 114a-1 to 114a-n) and each data object 114b (e.g., any of data objects 114b-1 to 114b-n). The encoder stack 154 may extract a first set of features from a data object 114a. The first set of features may indicate a purpose of the data object 114a. The first set of features may be represented in a first feature vector. The encoder stack 154 may extract a second set of features from a data object 114b. The second set of features may indicate a purpose of the data object 114b. The second set of features may be represented in a second feature vector. The encoder stack 154 may compare the first feature vector to the second feature vector. The encoder stack 154 may determine a distance (e.g., Euclidean distance) between the first feature vector to the second feature vector. The encoder stack 154 may compare the determined Euclidean distance with a threshold distance (e.g., 0.1, 0.2, 0.01, etc.). If it is determined that the Euclidean distance is less than the threshold distance, the encoder stack 154 may determine that the data object 114b is a counterpart of the data object 114a. In other words, the encoder stack 154 may determine that the data object 114a and the counterpart data object 114b have the same or similar purpose. Otherwise, the encoder stack 154 may determine that the data object 114b is not a counterpart of the data object 114a. Examples of the purpose of the data object 114a,b may include defining the type of the function, defining the type of the input parameter, or defining the type of the output parameter.

The encoder stack 154 may be configured to identify data objects 114a that are specific to a particular domain. The particular domain may be related to web application development, mobile application development, accounting, etc. for example. To this end, the encoder stack 154 may access the domain-specific dataset 166. The domain-specific dataset 166 may include keywords associated with the specific domain.

The encoder stack 154 may implement text processing to determine if a data object 114a is related to the particular domain based on determining whether the data object 114a is among the keywords included in the domain-specific dataset 166. If it is determined that a data object 114a is among the keywords included in the domain-specific dataset 166, the encoder stack 154 may maintain the data object 114a in the target programming language 118.

The decoder stack 156 may include multiple decoders 156. Each decoder 156 may include neural networks. The decoder stack 156 may be configured to translate the source code 102 from the original programming language 116 to the target programming language 118. In this process, the decoder stack 156 may receive information from the encoder stack 154 that indicates the masked code (210 in FIG. 2), predictions of counterpart data objects 114b, and domain-specific dataset 166.

The decoder stack 156 may access the mapping table 158. The decoder stack 156 may be trained by a training dataset that includes sample code snippets in the original programming language 116, each labeled with a corresponding code snippet in the target original programming language 118. In a training stage, the decoder stack 156 may learn the associations between the sample code snippets and corresponding code snippets by extracting a first set of features from the sample code snippets, extracting a second set of features from the corresponding code snippets, comparing the first set of features with the second set of features, and learning to associate the first set of features to the second set of features. The decoder stack 156 may also identify the syntax to be used in the target programming language 118 to create the updated version of the source code 102b.

In a testing stage, the decoder stack 156 may be given unlabeled code snippets in the original programming language 116 and is asked to determine the code snippets in the target programming language 118. The result of the prediction of the decoder stack 156 may be compared with the labels of the code snippets to determine the accuracy percentage of the decoder stack 156. In a refining stage and back propagation process, the weight and bias values of neural network of the decoder stack 156 may be updated to increase the accuracy of the prediction of the decoder stack 156.

Mapping table 158 may include a set of data objects 114a (e.g., data objects 114a-1 to n) mapped to a set of counterpart data objects 114b (e.g., data objects 114b-1 to n). The data objects 114a may be unique to the original programming language 116. For example, the data objects 114a may include keywords, symbols, and syntax that are used in the original programming language 116 and may be unique to the original programming language 116. The counterpart data objects 114b may be used in the target programming language 118. For example, the counterpart data objects 114b may include keywords, symbols, and syntax used in the target programming language 118. The data objects 114b may be unique to the target programming language 118. For example, the data object 114a-1 is mapped to the counterpart data object 114b-1, and the data object 114a-n is mapped to the counterpart data object 114b-n.

Sentence creator machine learning module 312 may be configured by the processor 142 executing the software instructions 148, and is generally configured to create a sentence for each line of code 102a. In certain embodiments, the sentence creator machine learning module 312 may include a support vector machine, neural network, random forest, k-means clustering, Tree-based algorithm, Random Forest algorithm, etc. In certain embodiments, the vocabulary to programming language machine learning module 314 may include text processing, NLP algorithms, and the like. In certain embodiments, the sentence creator machine learning module 312 may be implemented by a plurality of neural network layers, convolutional neural network layers, LSTM layers, Bi-directional LSTM layers, recurrent neural network layers, and the like. The sentence creator machine learning module 312 may be implemented by supervised, semi-supervised, or unsupervised training algorithms. In certain embodiments, the sentence creator machine learning module 312 may perform word segmentation, sentence segmentation, word tokenization, sentence tokenization, sentiment analysis, and/or the like to process and analyze each data object 114 of the source code 102a. In certain embodiments, the sentence creator machine learning module 312 may be configured to determine the logic and task flow of the source code 102a.

The sentence creator machine learning module 312 may be given an expression-text class table 310. The expression-text class table 310 may include classes of expressions syntax with a common interpretation in a respective class. The expression syntaxes in each class may be from multiple programming languages. The sentence creator machine learning module 312 may be able to identify the text interpretation or equivalent of a particular expression syntax based on searching in the table 310 and identifying a mapped text to the particular expression syntax.

The sentence creator machine learning module 312 may be trained with a training dataset that comprises sample code lines, each labeled with a respective non-programming language text which indicates an interpretation of the respective code line. Each sample code line may include one or more data objects 114, e.g., words, symbols, expressions, etc. The sentence creator machine learning module 312 may be configured to learn to associate each sample code line and its respective label. In this process, the sentence creator machine learning module 312 may extract a first set of features from a training code line labeled with a respective text interpretation, where the first set of features may indicate characteristics of the data objects 114, such as positions, interpretation, etc. The first set of features may be represented by a first feature vector. The sentence creator machine learning module 312 may associate the first feature vector with the label of the code line.

In a testing stage, the sentence creator machine learning module 312 may be given unlabeled code lines and asked to predict text that indicates the interpretation of the each code line. The sentence creator machine learning module 312 may compare the unlabeled code lines with the training dataset. In this operation, the sentence creator machine learning module 312 may extract a second set of features from an unlabeled code line, where the second set of features may indicate characteristics of the data objects 114 in the unlabeled code line, e.g., positions, interpretations, etc. The second set of features may be represented by a second feature vector. The sentence creator machine learning module 312 may compare the first feature vector with the second feature vector. The sentence creator machine learning module 312 may determine that the first feature vector corresponds to the second feature vector if the Euclidean distance between the first feature vector and the second feature vector is less than a threshold distance (e.g., less than 0.1, 0.01, etc.). If the first feature vector corresponds to the second feature vector, the sentence creator machine learning module 312 may determine that the unlabeled code line is associated with a similar text interpretation that the training code line is associated with. The sentence creator machine learning module 312 may perform similar operations for each unlabeled code line to evaluate against each training code line from the training dataset.

Vocabulary to programming language machine learning module 314 may be implemented by the processor 142 executing the software instructions 148, and is generally configured to convent non-programming language into a programming language. In certain embodiments, the vocabulary to programming language machine learning module 314 may include a support vector machine, neural network, random forest, k-means clustering, Tree-based algorithm, Random Forest algorithm, etc. In certain embodiments, the vocabulary to programming language machine learning module 314 may include text processing, NLP algorithms, and the like. In certain embodiments, the vocabulary to programming language machine learning module 314 may be implemented by a plurality of neural network layers, convolutional neural network layers, LSTM layers, Bi-directional LSTM layers, recurrent neural network layers, and the like. The vocabulary to programming language machine learning module 314 may be implemented by supervised, semi-supervised, or unsupervised training algorithms. In certain embodiments, the vocabulary to programming language machine learning module 314 may perform word segmentation, sentence segmentation, word tokenization, sentence tokenization, sentiment analysis, and/or the like to process and analyze each word in a non-programming language. In certain embodiments, the vocabulary to programming language machine learning module 314 may be trained, tested, and refined to be able to determine a piece of code that represents an equivalent of a respective non-programming text interpretation. For example, the vocabulary to programming language machine learning module 314 may be trained by a training dataset comprising sample text interpretations, each labeled with a respective piece of code in a target programming language. The vocabulary to programming language machine learning module 314 may be configured to learn to associate the sample text interpretation with a respective label, by extracting features from them and producing a feature vector, via a neural network.

The vocabulary to programming language machine learning module 314 may compare extracted features from sample text interpretations with features of unlabeled text interpretations to determine if they correspond to one another, for example, by comparing the first feature vector (associated with a labeled text from training dataset) with a second feature vector that represents a testing and unlabeled text). The vocabulary to programming language machine learning module 314 may determine that the first feature vector corresponds to the second feature vector if the Euclidean distance between the first feature vector and the second feature vector is less than a threshold distance (e.g., less than 0.1, 0.01, etc.). If the first feature vector corresponds to the second feature vector, the vocabulary to programming language machine learning module 314 may determine that the unlabeled text is associated with a similar code line that the labeled text is associated with. The vocabulary to programming language machine learning module 314 may be configured to convert text in any non-programming language into any programming language as desired. In certain embodiments, the vocabulary to programming language machine learning module 314 may treat each word in an input text as an object and determine a counterpart and mapped data object in the target programming language, e.g., using a mapping table.

The rule engine 316 may be implemented by the processor 142 executing the software instructions 148, and is generally configured to create a piece of code 102b in a target programming language 118 based on syntax rules 318, and information received from the vocabulary to programming language machine learning module 314 and the sentence creator machine learning module 312. In certain embodiments, the rule engine 316 may be a rule-based engine that follows the syntax rules 318 to create the piece of code 102b in the target programming language 118 using the syntax of the target programming language 118. In certain embodiments, the rule engine 316 may include a plurality of neural network layers, convolutional neural network layers, LSTM layers, Bi-directional LSTM layers, recurrent neural network layers, and the like. The rule engine 316 may be implemented by supervised, semi-supervised, or unsupervised training algorithms. The syntax rules 318 may indicate the syntax and programming structure used in the target programming language 118. For example, the syntax rule 318 may indicate how data objects 114b should be assembled to satisfy the syntax rules of the target programming language 118.

Operational Flow for Updating the Source Code from One Programming Language to Another FIG. 2 illustrates an operational flow 200 of system 100 (see FIG. 1) for updating the source code 102 from one programming language to another. The operational flow 200 may begin when the source code 102a in the original programming language 116 is received from a computing device (120 in FIG. 1). The source code 102a in the original programming language 116 is fed to the code parser 150.

The code parser 150 parses the source code 102 and identifies a set of data objects 114a-1 to n from the source code 102a, similar to that described in FIG. 1. The code parser 150 may also determine the logic of the source code 102a, and the relationship between different data objects 114a-1 to n. The code parser 150 may create a workflow of the source code 102 with a parameter list, predefined keywords, expressions used in the source code 102, and syntax of the original programming language 116.

The code parser 150 may create the knowledge graph 160a that represents the relationship between the data objects 114a-1 to n. The knowledge graph 160a may be created based on the position of each data object 114a-1 to n with respect to the position of other data objects 114a-1 to n. An example knowledge graph 160a associated with the example snippet of the source code 102a may be illustrated in FIG. 2, where the example snippet of the source code 102 is as follows:

Public String getFullName (String firstName, String secondName){
   return firstName+secondName;
}.

The knowledge graph 160a is fed to the code processing machine learning module 152.

Identifying Data Objects from the Source Code that are Unique to the Original Programming Language The code processing machine learning module 152 may identify one or more particular data objects 114a from among the data objects 114a-1 to n, where the one or more particular data objects 114a are unique to the original programming language 116, similar to that described in FIG. 1. For example, the code processing machine learning module 152 may compare each data object 114a-1 to n with each keyword 164 and determine whether each data object 114a-1 to n is among the keywords 164, similar to that described in FIG. 1.

Upon identifying the unique data objects 114a, the code processing machine learning module 152 may mask the identified data objects 114a and produce a masked code 210. The code processing machine learning module 152 may mask the unique data objects 114a by replacing them with random characters, such as "XXX" or other characters. In FIG. 2, an example masked code 210 may be the following:

Public XXX getFullName (String firstName, String XXX){
   XXX firstName+secondName;
}

In the example of FIG. 2, the data objects 114a "string" and "return" are determined to be unique to the original programming language 116 (e.g., Java) and not used in the target programming language 118 (e.g., Python). In the example of FIG. 2, "secondName" is also masked because "secondName" may not be used in the target programming language 118. Thus, a name of a variable may also be masked. The code processing machine learning module 152 may mask these data objects 114a, for example, by replacing them with "XXX" as shown in the masked code 210.

The code processing machine learning module 152 may convert the masked code 210 into the vector 212 that represents the masked code 210 and knowledge graph 160a in numerical format. The vector 212 may include one or more vectors, including token embedding, segment embedding, and position embedding associated with the source code 102, similar to that described in FIG. 1. The code processing machine learning module 152 may generate the token embedding that represents each word in the source code 102. The segment embedding may be a vector used to distinguish different sentences in the source code 102. The position embedding may be a vector that provides information about a position of each word in a sentence.

Creating a Piece of Code in the Target Programming Language

The vector 212 may be fed to the encoder stack 154. The encoder stack 154 may evaluate each masked portion (e.g., masked data object 114a) in the masked code 210 and determine the purpose of the masked portion based on the position of the masked portion with respect to its neighboring data objects 114a, words, or portions in the masked code 210. In the illustrated example, the encoder stack 154 may determine that a first masked data object 114a in the first line of masked code 210 is positioned between "Public" and "getFullName". Based on the determined logic, syntax, and knowledge graph 160a, the encoder stack 154 may determine that "Public" in a keyword used to identify a type of a function, "getFullName" is a name of the function, and the purpose of the first masked data object 114a is to define a type of return parameter of the function.

Similarly, the encoder stack 154 may determine that a second masked data object 114a in the second line of masked code 210 is positioned after "String" and is associated with an input parameter of the function. Based on the determined logic, syntax, and knowledge graph 160a, the encoder stack 154 may determine that "String" indicates a type of the second masked data object 114a, and the purpose of the second masked data object 114a is to define a name for the input parameter to the function.

Similarly, the encoder stack 154 may determine that a third masked data object 114a in the third line of masked code 210 is positioned before "firstName+secondName". Based on the determined logic, syntax, and knowledge graph 160a, the encoder stack 154 may determine that "firstName+secondName" indicates an output of the function "getFullName", and the purpose of the third masked data object 114a is to define a type of the output parameter to the function.

The encoder stack 154 may access the mapping table 158 and identify the counterpart data object 114b to each masked data object 114a as indicated in the mapping table 158, similar to that described in FIG. 1. Based on the identified purpose of each masked data object 114a and the mapping table 158, the encoder stack 154 may determine a counterpart data object 114b (in the target programming language 118) that is used for the same or similar purpose as the data object 114a (in the original programming language 116).

The encoder stack 154 may also access the domain-specific dataset 166 and identify data objects 144a that are related to the particular domain or technology field. The encoder stack 154 may be tuned to update source code 102 that is used in the particular domain or technology field, similar to that described in FIG. 1. The domain-specific dataset 166 may be fed to one of the encoders of the encoder stack 154 so that the encoder 154 may learn to identify data objects 114a related to the particular domain or technology field by evaluating each data object 114a and the domain-specific dataset 166. In certain embodiments, the encoder stack 154 may include a positional encoder that is an instance of an encoder 154 and is configured to determine the position of each word in the vector 212 and evaluate each word to determine information about relational positions of the words in the vector 212.

The output of the encoder stack 154 may be a vector 214 that represents the vector 212, learned information from the domain-specific dataset 166, and predictions of counterpart data objects 114b for each masked data object 114a, among other data. In certain embodiments, the vector 214 may be a compressed low-dimension vector compared to the vector 212. The vector 214 is fed to the decoder stack 156.

The decoder stack 156 may access the mapping table 158. The decoder stack 156 may access the labeled code snippets 216. The labeled code snippets 216 may include code snippets in the target programming language 118, where different data objects 114b are labeled with a purpose and interpretation of the data object 114b. The decoder stack 156 may use this information to translate, convert, or update the source code 102 from the original programming language 116 to the target programming language 118. In this process, the decoder stack 156 may assemble words, keywords, and characters (collectively referred to herein as data objects 114b-1 to *n*) and create a piece of code 102b in the target programming language 118 by replacing the masked data objects 114a with the determined counterpart data objects 114b and maintaining the rest of the data objects 114a from the original programming language 116. In the example of FIG. 2, the created piece of code 102b in the target programming language 118 may be the following:

```
def getFullName ( firstName, lastname):
    firstName+secondName.
```

Verifying the Code in the Target Programming Language

In certain embodiments, the code validator device 140 (e.g. code processing machine learning module 152) may determine whether the created piece of code 102b in the target programming language 118 is configured to perform the particular task 104. In other words, the code validator device 140 may verify whether the created piece of code 102b performs the same function (i.e., has the same logic and flow) as the source code 102a in the original programming language 116. To this end, the code validator device 140 may feed the created code 102b to the code parser 150. The code parser 150 may perform similar operations described herein with respect to the source code 102a in the original programming language 116, similar to that described in FIG. 1. For example, the code parser 150 may identify data objects 114b-1 to *n* from the created code 102b by implementing object-oriented programming.

The code parser 150 may create a workflow of the source code 102b with a parameter list, predefined keywords, expressions used in the source code 102b, and syntax of the target programming language 118. The code parser 150 may determine the relationship among the data objects 114b-1 to *n* based on the position of each data object 114b-1 to *n* with respect to the position of other data objects 114b-1 to *n*. The code parser 150 may create a knowledge graph 160b that represents the relationship between the data objects 114b-1 to *n* based on the positions of the data objects 114b-1 to *n*.

The code parser 150 may determine whether the created code 102b is configured to perform the task 104 based on the knowledge graphs 160*a* and *b*. In this process, the code parser 150 may compare the knowledge graph 160*a* with the knowledge graph 160*b* to determine whether the function (and workflow) of the source code 102*a* corresponds to the function (and workflow) of the source code 102*b*. The code validator device 140 (e.g., via code processing machine learning module 152 and/or code parser 150) may extract a first set of features from the knowledge graph 160*a*. The first set of features may indicate a first function (or first workflow) of the source code 102*a*. The first set of features may be represented by a first feature vector. The code validator device 140 (e.g., via code processing machine learning module 152 and/or code parser 150) may extract a second set of features from the knowledge graph 160*b*. The second set of features may indicate a second function (or second workflow) of the source code 102*b*. The second set of features may be represented by a second feature vector. For example, the code processing machine learning module 152 and/or code parser 150 may be trained by a training dataset comprising a set of labeled code snippets labeled with respective functions. The code processing machine learning module 152 and/or code parser 150 may learn the associations between the sample code snippet and the respective function based on feeding the training dataset along with syntax rules to a neural network. In this manner, the code processing machine learning module 152 and/or code parser 150 may learn to determine a function of a code snippet.

The code validator device 140 (e.g., via code processing machine learning module 152 and/or code parser 150) may compare the first feature vector with the second feature vector. The code validator device 140 (e.g., via code processing machine learning module 152 and/or code parser 150) may determine a distance (e.g., Euclidean distance) between the first feature vector to the second feature vector. The code validator device 140 may compare the determined Euclidean distance with a threshold distance (e.g., 0.1, 0.2, 0.01, etc.). If it is determined that the Euclidean distance is less than the threshold distance, the code validator device 140 may determine that the first function (of the source 102*a*) corresponds to the second function (of the source code 102*b*). In response, the code validator device 140 may determine that the second piece of code 102*b* is configured to perform the task 104. Otherwise, the code validator device 140 may determine that second piece of code 102*b* is configured to perform the task 104 not configured to perform the task 104. If it is determined that the knowledge graph 160*a* corresponds to the knowledge graph 160*b*, the code validator device 140 may execute multiple test cases using the created code 102*b*. For example, the code validator device 140 may execute various portions of the code 102*b*, and counterpart portions of the source code 102*a*. The execution results from the executed portions of the source code 102*a* may be expected.

The code validator device 140 may compare the result of the test cases (from the portions of the code 102*b*) with the expected results (from the portions of the code 102*a*). If more than a threshold percentage (e.g., more than 90%, 95%, etc.) of the test case results correspond to the expected results, the code validator device 140 may confirm that the logic and task flow of the created code 102*b* are expected and accurate. Otherwise, the code validator device 140 may refine and retrain the code processing machine learning module 152 and/or code parser 150 in a back propagation process.

Method for Updating the Source Code from One Programming Language to Another

Figure 3:
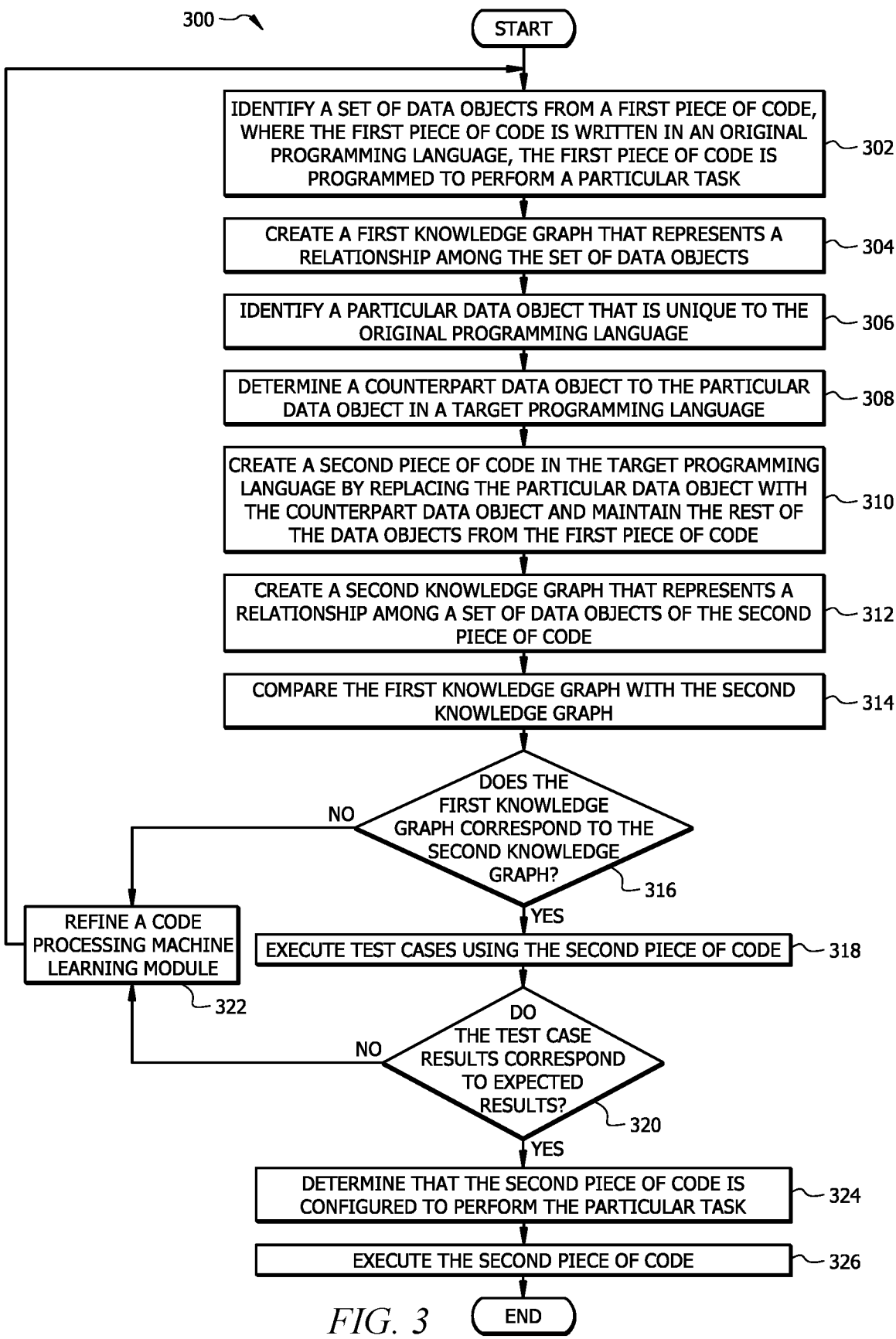
FIG. 3 illustrates an example flowchart of a method for updating source code from an original programming language to a target programming language.

FIG. 3 illustrates an example flowchart of a method 300 for updating source code from one programming language to another. Modifications, additions, or omissions may be made to method 300. Method 300 may include more, fewer, or other operations. For example, operations may be performed in parallel or in any suitable order. While at times discussed as the system 100, code validator device 120, or components of any of thereof performing operations, any suitable system or components of the system may perform one or more operations of the method 300. For example, one or more operations of method 300 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 302-326.

At operation 302, the code validator device 140 identifies a set of data objects 114*a*-1 to *n* from a first piece of code 102*a*, where the first piece of code 102*a* is written in an original programming language 116, the first piece of code 102*a* is programmed to perform a particular task 104. For example, the code validator device 140 may feed the first piece of code 102*a* to the code parser 150 to identify the set of data objects 114*a*-1 to *n*, similar to that described in FIGS. 1-2. The code validator device 140 may also determine the function, logic, and task flow associated with the first piece of code 102*a* via the code parser 150.

At operation 304, the code validator device 140 creates a first knowledge graph 160*a* that represents the relationship among the set of data objects 114*a*-1 to *n*, similar to that described in FIGS. 1-2.

At operation 306, the code validator device 140 identifies a particular data object 114*a* that is unique to the original programming language 116. For example, the code validator device 140 may compare each data object 114*a*-1 to *n* with each keyword 164 and determine whether any data object 114*a*-1 to *n* is among the keywords 164, similar to that described in FIGS. 1-2.

At operation 308, the code validator device 140 determines a counterpart data object 114*b* to the particular data object 114*a* in the target programming language 118. For example, the code validator device 140 may identify the counterpart data object 114*b* based on the purpose of the particular data object 114*a* and the mapping table 158 via the encoder stack 154, similar to that described in FIGS. 1-2.

At operation 310, the code validator device 140 creates a second piece of code 102*b* in the target programming language 118 by replacing the particular data object 114*a* with the counterpart data object 114*b* and maintaining the rest of the data objects 114*a* from the first piece of code 102*a*, e.g., via the decoder stack 156, similar to that described in FIGS. 1-2.

At operation 312, the code validator device 140 creates a second knowledge graph 160*b* that represents a relationship among the set of data objects 114*b*-1 to *n* of the second piece of code 102*b*. The operation of validating the second piece of code 102*b* may be performed in operations 314-326. For example, the code validator device 140 may feed the second piece of code 102*b* to the code parser 150, similar to that described in FIGS. 1-2.

At operation 314, the code validator device 140 compares the first knowledge graph 160*a* with the second knowledge graph 160*b*, similar to that described in FIGS. 1-2. At operation 316, the code validator device 140 determines whether the first knowledge graph 160*a* corresponds to the second knowledge graph 160*b*, similar to that described in FIGS. 1-2. If it is determined that the first knowledge graph 160*a* corresponds to the second knowledge graph 160*b*, method 300 proceeds to operation 318. Otherwise, method 300 proceeds to operation 322.

At operation 318, the code validator device 140 executes test cases using the second piece of code 102*b*. In other words, the code validator device 140 executes various portions of the second piece of code 102*b* separated by entry and exit points. At operation 320, the code validator device 140 determines whether the test case results correspond to the expected results, similar to that described in FIGS. 1-2. If it is determined that the test case results correspond to the expected results, method 300 proceeds to operation 324. Otherwise, method 300 proceeds to operation 322.

At operation 322, the code validator device 140 refines the code processing machine learning module 152, e.g., in a back propagation operation. At operation 324, the code validator device 140 determines that the second piece of code 102*b* is configured to perform the particular task 104. At operation 326, the code validator device 140 executes the second piece of code 102*b*.

Figure 4:
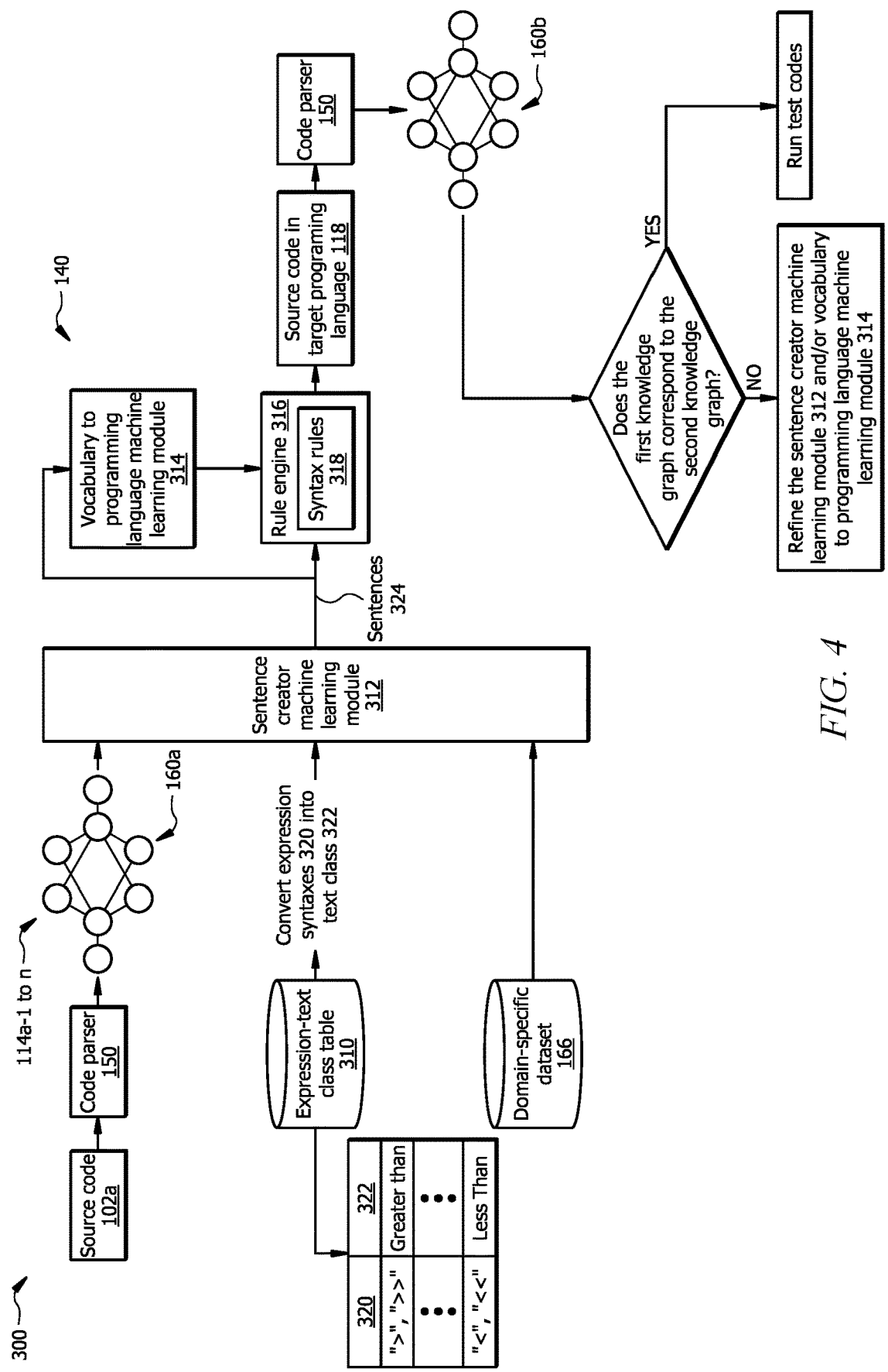
FIG. 4 illustrates an example operational flow of the system of FIG. 1 for verifying source code by converting the source code into a non-programming language.

Operational Flow for Source Code Validation Based on Converting the Source Code into a Non-Programming Language FIG. 4 illustrates an example operational flow 400 of the system 100 (see FIG. 1) for validating the source code 102 based on converting the source code 102 into a non-programming language. The operational flow 400 may begin when the original source code 102*a* in the original programming language 116 is received from the computing device 120 (see FIG. 1). The code validator device 140 feeds the source code 102*a* to the code parser 150. The code parser 150 identifies the data objects 114*a*-1 to *n* of the source code 102*a* and creates a knowledge graph 160*a* that represents the relationship between the data objects 114*a*-1 to *n*, similar to that described in FIG. 2.

The code validator device 140 feeds the knowledge graph 160*a* to the sentence creator machine learning module 312. The code validator device 140 feeds the expression-text class table 310 to the sentence creator machine learning module 312. The expression-text class table 310 may include classes 322 of expressions syntax 320 with a common interpretation in each class. For example, a class 322 may include "<", "<<" which mean "greater than". In this example class, all the expression syntaxes are mapped to the words "greater than". In another example, a class 322 may include ">", ">>" which mean "less than". In this example class, all the expression syntaxes are mapped to the words "less than". Other expressions 320, including, "=", "!=", "+", "−", "+=", "−=", "=<", etc. may have respective classes 322. The sentence creator machine learning module 312 may identify text interpretation as indicated by a class 322 of an expressions 320 used in the source code 102*a* by searching the expression-text class table 310.

Creating a Sentence for Each Code Line

The code validator device 140 may feed the domain-specific dataset 166 to the sentence creator machine learning module 312. The sentence creator machine learning module 312 may identify data objects 114*a*-1 to *n* that are among the keywords included in the domain-specific dataset 166, similar to that described in FIG. 2. The sentence creator machine learning module 312 may maintain the data objects 114*a*- to *n* that are among the keywords included in the domain-specific dataset 166 in the source code 102*b* during the operational flow 400.

Based on the knowledge graph 160*a*, determined text class 322 of expressions 320, and domain-specific dataset 166, the sentence creator machine learning module 312 may create a sentence 342 for each line of source code 102*a*. In this process, the sentence creator machine learning module 312 may determine an interpretation of each code line based on the learned associations between sample code lines and respective text interpretations in a training dataset, similar to that described in FIG. 1. The output of the sentence creator machine learning module 312 may be multiple sentences 324 that indicate the determined interpretation of each code line of the source code 102*a*. In certain embodiments, the sentences 324 may be converted from vectors outputted by the sentence creator machine learning module 312, where each vector is a numerical representation of the respective sentence 324.

Converting the Text into a Piece of Code in a Target Programming Language

The vocabulary to programming language machine learning module 314 may be configured to determine a piece of code in the target programming language 118 from an input text interpretation, similar to that described in FIG. 1. The sentences 324 determined by the sentence creator machine learning module 312 may be fed to the vocabulary to programming language machine learning module 314.

The vocabulary to programming language machine learning module 314 may convert the sentence 324 into apiece of code in the target programming language 118. In certain embodiments, the output of the vocabulary to programming language machine learning module 314 may be a vector (i.e., embedding) that is a numerical representation of a piece of code in the target programming language 118.

In certain embodiments, the output of the vocabulary to programming language machine learning module 314 may be the piece of code in the target programming language 118. The output of the vocabulary to programming language machine learning module 314 may not be sequence or position-based—meaning that the output of the vocabulary to programming language machine learning module 314 may not follow a sequence and/or position of the words from the input. Thus, the rule engine 316 may be used to form the code 102*b* in the correct syntax and structure associated with the target programming language 118. The output of the vocabulary to programming language machine learning module 314 and the sentence creator machine learning module 312 may be fed to the rule engine 316.

The rule engine 316 may use the received information and the syntax rules 318 to create a second price of source code 102*b* in the target programming language 118 that follows the syntax and structure used in the target programming language 118. In certain embodiments, the output of the rule engine 316 may be the piece of code that performs a function as indicated in the interpretation of the input text to the vocabulary to programming language machine learning module 314.

Verifying the Code in the Target Programming Language

The code validator device 140 may be configured to validate the created code 102*b* that is created by converting the source code 102*a* into a non-programming language via the sentence creator machine learning module 312 and the vocabulary to programming language machine learning module 314, similar to that described in FIG. 2. In this process, the code validator device 140 may determine whether the created piece of code 102*b* in the target programming language 118 is configured to perform the particular task 104. In other words, the code validator device 140 may verify whether the created piece of code 102*b* performs the same function (i.e., has the same logic and flow) as the source code 102a in the original programming language 116. To this end, the code validator device 140 may feed the created code 102b to the code parser 150. The code parser 150 may perform similar operations described herein with respect to the source code 102a in the original programming language 116, similar to that described in FIG. 1. For example, the code parser 150 may identify data objects 114b-1 to n from the created code 102b and create the knowledge graph 160b that represents the relationship between the data objects 114b-1 to n based on the positions of the data objects 114b-1 to n.

The code parser 150 may determine whether the created code 102b is configured to perform the task 104 based on the knowledge graphs 160a and b. In this process, the code parser 150 may compare the knowledge graph 160a with the knowledge graph 160b to determine whether the function (and workflow) of the source code 102a corresponds to the function (and workflow) of the source code 102b, similar to that described in FIG. 2. If it is determined that the knowledge graph 160a corresponds to the knowledge graph 160b, the code validator device 140 may execute multiple test cases using the created code 102b. For example, the code validator device 140 may execute various portions of the code 102b, and counterpart portions of the source code 102a. The execution results from the executed portions of the source code 102a may be expected. The code validator device 140 may compare the result of the test cases (from the portions of the code 102b) with the expected results (from the portions of the code 102a). If the test case results correspond to the expected results, the code validator device 140 may confirm that the logic and task flow of the created code 102b are expected and accurate. Otherwise, the code validator device 140 may refine and retrain the code processing machine learning module 152 and/or code parser 150 in a back propagation process.

In certain embodiments, the code validator device 140 may determine that the translation of the source code 102a to non-programming language is correct if by converting the non-programming language to a piece of code 102b in the target programming language 118 and determining if the knowledge graph 160a corresponds to the knowledge graph 160b.

Figure 5:
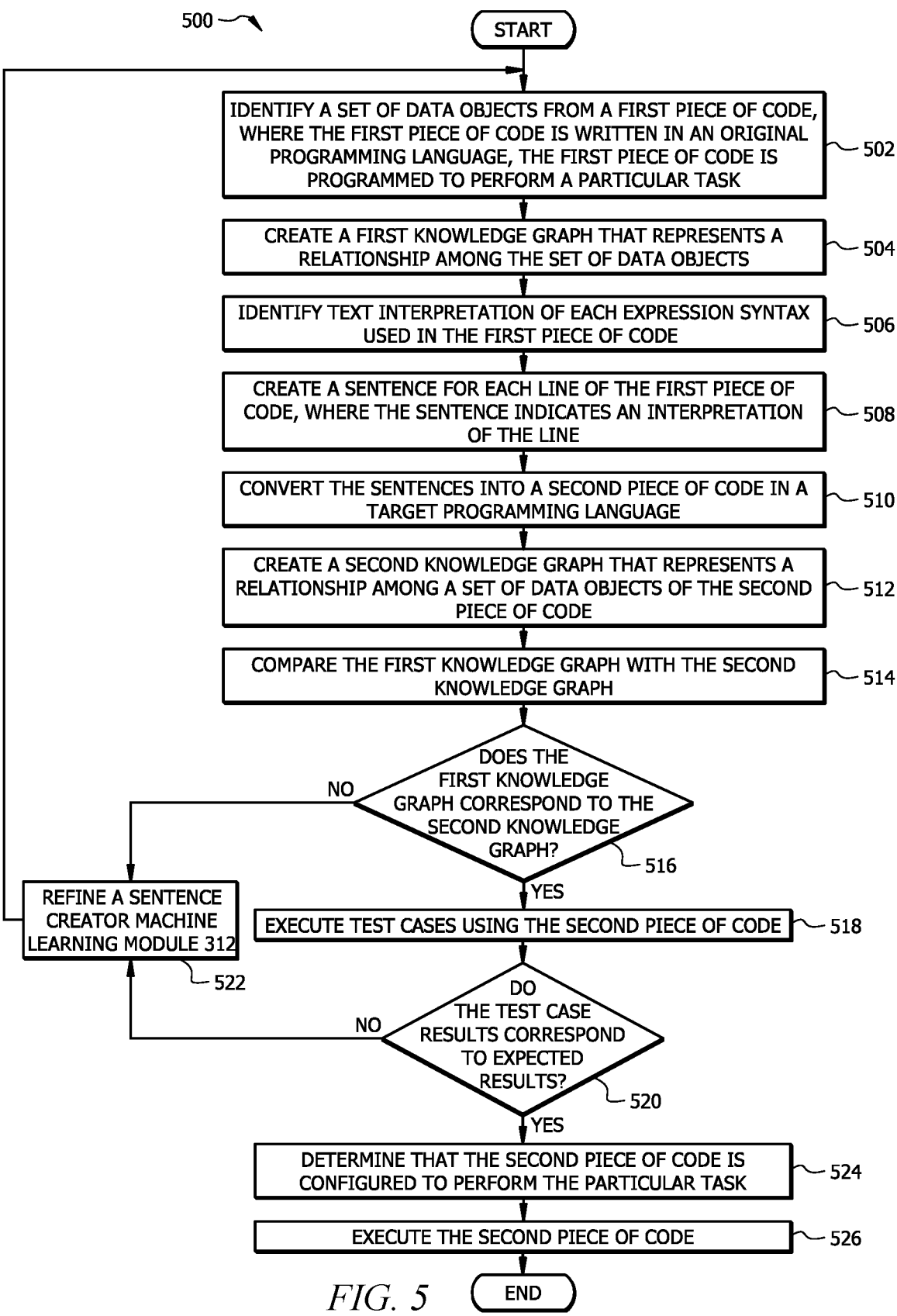
FIG. 5 illustrates an example flowchart of a method for verifying source code by converting the source code into a non-programming language.

Method for Verifying Source Code by Converting the Source Code into a Non-Programming Language FIG. 5 illustrates an example flowchart of a method 500 verifying source code by converting the source code into a non-programming language. Modifications, additions, or omissions may be made to method 500. Method 500 may include more, fewer, or other operations. For example, operations may be performed in parallel or in any suitable order. While at times discussed as the system 100, code validator device 120, or components of any of thereof performing operations, any suitable system or components of the system may perform one or more operations of the method 500. For example, one or more operations of method 500 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 502-526.

At operation 502, the code validator device 140 identifies a set of data objects 114a-1 to n from a first piece of code 102a, where the first piece of code 102a is written in an original programming language 116, the first piece of code 102a is programmed to perform a particular task 104, similar to that described in FIGS. 1-4.

At operation 504, the code validator device 140 creates a first knowledge graph 160a that represents the relationship among the set of data objects 114a-1 to n, similar to that described in FIGS. 1-2. At operation 506, the code validator device 140 identifies text interpretation 322 of each expression syntaxes 320 used in the first piece of code 102a. For example, the code validator device 140 may identify an expression syntax 320 from the code 102a and determine the interpretation 322 of the expression syntax 320 in response to identifying that the identified expression syntax 320 is among the plurality of expression syntaxes 320 in the expression-to-text map 310, similar to that described in FIG. 4.

At operation 508, the code validator device 140 creates a sentence 324 for each line of the first piece of code 102a, where the sentence 324 indicates an interpretation of the line. The sentences 324 may indicate an interpretation of lines of the first piece of code 102a. For example, the code validator device 140 may implement the sentence creator machine learning module 312 to create a sentence 324 for each line of the code 102a, similar to that described in FIG. 4. The code validator device 140 may create the sentences 324 based on the knowledge graph 160a, determined interpretation 322 of expressions 320, and domain-specific dataset 164. In the same or another example, the code validator device 140 may use code compilers to create sentences 324. In certain embodiments, the code validator device 140 may create the sentences 324 based on knowledge graph 160a, the domain-specific dataset 164, and the interpretation of the identified expression syntax 320. For example, for each data object 114b from among the set of data objects 114b, the code validator device 140 may determine an equivalent text that has a corresponding meaning as the data object 114b. in response, the code validator device 140 may form the sentence 324 by combining the determined equivalent text associated with each data object 114b with the determined interpretation of identified expression syntax 320.

At operation 510, the code validator device 140 converts the sentences 324 into a second piece of code 102b in a target programming language 118, e.g., by implementing the vocabulary to programing language machine learning module 314 and rule engine 316, similar to that described in FIG. 4. The code validator device 140 may create the second piece of code 102b based on the determined plurality of counterpart data objects 114b-1 to n and the syntax rule 318, such that the created second price of code 102b satisfies the syntax rules 318.

In this process, the code validator device 140 may determine, for a plurality of words in each sentence 324, a plurality of counterpart data objects 114b-1 to n in the target programming language 118, where each of the plurality of counterpart data objects 114b-1 to n is determined for a particular word in the plurality of words in each sentence 324. For example, the code validator device 140 may access a training dataset comprising sample text labeled with a respective data object in the target programming language 118. The code validator device 140 may extract a first set of features from the sample text, wherein the first set of features indicates an interpretation of the sample text. The first set of features is represented by a first feature vector. The code validator device 140 may extract a second set of features from a word in the created sentence, where the second set of features indicates an interpretation of the word. The second set of features is represented by a second feature vector. The code validator device 140 may compare the first feature vector with the second feature vector. The code validator device 140 may determine a Euclidean distance between the first feature vector and the second feature vector. The code validator device 140 may compare the determined distance between the first feature vector and the second feature vector with a threshold distance (e.g., 0.1, 0.01, etc.). The code validator device 140 may determine if the determined distance is less than the second threshold distance. In response to determining that the determined distance is less than the second threshold distance, the code validator device 140 may determine that the respective data object 114b is a counterpart to the word in the target programming language 118. The code validator device 140 may perform similar operations to determine other counterpart data objects 114b-1 to *n* for other words in each sentence 324.

At operation 512, the code validator device 140 creates a second knowledge graph 160b that represents a relationship between the set of data objects 114b-1 to *n* of the second piece of code 104b. The operation of validating the second piece of code 102b may be performed in operations 514-526. For example, the code validator device 140 may feed the second piece of code 102b to the code parser 150, similar to that described in FIGS. 1-4.

At operation 514, the code validator device 140 compares the first knowledge graph 160a with the second knowledge graph 160b, similar to that described in FIGS. 1-4. At operation 516, the code validator device 140 determines whether the first knowledge graph 160a corresponds to the second knowledge graph 160b, similar to that described in FIGS. 1-4. If it is determined that the first knowledge graph 160a corresponds to the second knowledge graph 160b, method 500 proceeds to operation 518. Otherwise, method 500 proceeds to operation 522.

At operation 518, the code validator device 140 executes test cases using the second piece of code 102b. In other words, the code validator device 140 executes various portions of the second piece of code 102b separated by entry and exit points.

At operation 520, the code validator device 140 determines whether the test case results correspond to expected results, similar to that described in FIGS. 1-4. If it is determined that the test case results correspond to the expected results, method 500 proceeds to operation 524. Otherwise, method 500 proceeds to operation 522.

At operation 522, the code validator device 140 refines the sentence creator machine learning module 312 and/or vocabulary to programming language machine learning module 314, e.g., in a back propagation operation. At operation 524, the code validator device 140 determines that the second piece of code 102b is configured to perform the particular task 104. At operation 526, the code validator device 140 executes the second piece of code 102b.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for validating source code by converting the source code into a non-programming language, comprising:
a memory configured to store:
a first piece of code written in an original programming language, wherein the first piece of code is programmed to perform a particular task;
an expression-to-text map that comprises a plurality of expression syntaxes mapped to respective text, wherein the respective text indicates an interpretation of the plurality of expression syntaxes; and
a syntax rule associated with a target programming language, wherein the syntax rule indicates how data objects should be assembled to satisfy the syntax rule;
a processor operably coupled to the memory, and configured to:
identify a first set of data objects from the first piece of code, wherein the first set of data objects comprises at least one of a name of a function, a type of the function, an input parameter of the function, a type of the input parameter of the function, an output parameter of the function, or a type of the output parameter of the function;
create a first knowledge graph that represents a relationship among the first set of data objects, wherein the first knowledge graph is created based at least in part upon a position of each data object from among the first set of data objects with respect to positions of other data objects in the first piece of code;
identify an expression syntax from the first piece of code;
determine an interpretation of the identified expression syntax in response to identifying that the identified expression syntax is among the plurality of expression syntaxes in the expression-to-text map, wherein the respective text indicates the determined interpretation of the identified expression syntax;
create, based at least in part upon the first knowledge graph and the determined interpretation of the identified expression syntax, a sentence for at least one line of the first piece of code, wherein the created sentence indicates an interpretation of the at least one line of the first piece of code;
determine, for a plurality of words in the created sentence, a plurality of counterpart data objects in the target programming language, wherein each counterpart data object of the plurality of counterpart data objects is determined for a particular word in the plurality of words in the created sentence;
create a second piece of code in the target programming language based at least in part upon the determined plurality of counterpart data objects and the syntax rule, such that the second piece of code satisfies the syntax rule;

determine that the second piece of code is configured to perform the particular task; and in response to determining that the second piece of code is configured to perform the particular task, execute the second piece of code to perform the particular task.

2. The system of claim 1, wherein the processor is further configured to:

identify a second set of data objects from the second piece of code;

determine a relationship among the second set of data objects based at least in part upon a position of each data object in the second piece of code with respect to positions of other data objects from among the second set of data objects;

create a second knowledge graph that represents the relationship among the second set of data objects; and determine that the second piece of code is configured to perform the particular task based at least in part upon the first and second knowledge graphs.

3. The system of claim 2, wherein determining that the second piece of code is configured to perform the particular task based at least in part upon the first and second knowledge graphs comprises:

extracting a first set of features from the first knowledge graph, wherein the first set of features is represented by a first feature vector, and wherein the first set of features indicates a first task flow associated with the first piece of code;

extracting a second set of features from the second knowledge graph, wherein the second set of features is represented by a second feature vector, and wherein the second set of features indicates a second task flow associated with the second piece of code;

comparing the first feature vector with the second feature vector;

determining a distance between the first feature vector and the second feature vector;

comparing the determined distance between the first feature vector and the second feature vector with a threshold distance; and in response to determining that the determined distance between the first feature vector and the second feature vector is less than the threshold distance:

determining that the first task flow corresponds to the second task flow; and determining that the second piece of code is configured to perform the particular task.

4. The system of claim 1, wherein the processor is further configured to:

access a domain-specific dataset comprising a plurality of keywords associated with a specific domain, wherein the specific domain comprises web application development;

determine that a first data object, from among the first set of data objects, is among the plurality of keywords; and in response to determining that the first data object, from among the first set of data objects, is among the plurality of keywords, maintain the first data object in the second piece of code.

5. The system of claim 1, wherein the expression-to-text map is created by classifying each group of expression syntaxes in different programming languages into a respective class, and wherein each member of a group of expression syntaxes has a common interpretation as other members of the group of expression syntaxes.

6. The system of claim 1, wherein creating, based at least in part upon the first knowledge graph and the determined interpretation of the identified expression syntax, the sentence for the at least one line of the first piece of code, comprises:

for each data object from among the first set of data objects, determining an equivalent text that has a corresponding meaning as the data object; and forming the created sentence by combining the determined equivalent text associated with each data object from among the first set of data objects with the determined interpretation of the identified expression syntax.

7. The system of claim 1, wherein determining, for the plurality of words in the created sentence, the plurality of counterpart data objects in the target programming language, comprises:

accessing a training dataset comprising sample text labeled with a respective data object in the target programming language;

extracting a first set of features from the sample text, wherein the first set of features indicates an interpretation of the sample text, and wherein the first set of features is represented by a first feature vector;

extracting a second set of features from a word in the created sentence, wherein the second set of features indicates an interpretation of the word in the created sentence, and wherein the second set of features is represented by a second feature vector;

comparing the first feature vector with the second feature vector;

determining a distance between the first feature vector and the second feature vector;

comparing the determined distance between the first feature vector and the second feature vector with a threshold distance;

determining that the determined distance is less than the threshold distance; and in response to determining that the determined distance is less than the threshold distance, determining that the respective data object is a counterpart to the word in the created sentence in the target programming language.

8. A method for validating source code by converting the source code into a non-programming language, comprising:

storing, in a memory, a first piece of code written in an original programming language, wherein the first piece of code is programmed to perform a particular task; an expression-to-text map that comprises a plurality of expression syntaxes mapped to respective text, wherein the respective text indicates an interpretation of the plurality of expression syntaxes; and a syntax rule associated with a target programming language, and wherein the syntax rule indicates how data objects should be assembled to satisfy the syntax rule;

identifying a first set of data objects from the first piece of code, wherein the first set of data objects comprises at least one of a name of a function, a type of the function, an input parameter of the function, a type of the input parameter of the function, an output parameter of the function, or a type of the output parameter of the function;

creating a first knowledge graph that represents a relationship among the first set of data objects, wherein the first knowledge graph is created based at least in part upon a position of each data object from among the first set of data objects with respect to positions of other data objects in the first piece of code;

identifying an expression syntax from the first piece of code;

determining an interpretation of the identified expression syntax in response to identifying that the identified expression syntax is among the plurality of expression syntaxes in the expression-to-text map, wherein the respective text indicates the determined interpretation of the identified expression syntax;

creating, based at least in part upon the first knowledge graph and the determined interpretation of the identified expression syntax, a sentence for at least one line of the first piece of code, wherein the created sentence indicates an interpretation of the at least one line of the first piece of code;

determining, for a plurality of words in the created sentence, a plurality of counterpart data objects in the target programming language, wherein each counterpart data object of the plurality of counterpart data objects is determined for a particular word in the plurality of words in the created sentence;

creating a second piece of code in the target programming language based at least in part upon the determined plurality of counterpart data objects and the syntax rule, such that the second piece of code satisfies the syntax rule;

determining that the second piece of code is configured to perform the particular task; and in response to determining that the second piece of code is configured to perform the particular task, executing the second piece of code to perform the particular task.

9. The method of claim 8, further comprising:
identifying a second set of data objects from the second piece of code;

determining a relationship among the second set of data objects based at least in part upon a position of each data object in the second piece of code with respect to positions of other data objects from among the second set of data objects;

creating a second knowledge graph that represents the relationship among the second set of data objects; and determining that the second piece of code is configured to perform the particular task based at least in part upon the first and second knowledge graphs.

10. The method of claim 9, wherein determining that the second piece of code is configured to perform the particular task based at least in part upon the first and second knowledge graphs comprises:

extracting a first set of features from the first knowledge graph, wherein the first set of features is represented by a first feature vector, and wherein the first set of features indicates a first task flow associated with the first piece of code;

extracting a second set of features from the second knowledge graph, wherein the second set of features is represented by a second feature vector, and wherein the second set of features indicates a second task flow associated with the second piece of code;

comparing the first feature vector with the second feature vector;

determining a distance between the first feature vector and the second feature vector;

comparing the determined distance between the first feature vector and the second feature vector with a threshold distance; and in response to determining that the determined distance between the first feature vector and the second feature vector is less than the threshold distance:
  determining that the first task flow corresponds to the second task flow; and
  determining that the second piece of code is configured to perform the particular task.

11. The method of claim 8, further comprising:
accessing a domain-specific dataset comprising a plurality of keywords associated with a specific domain, wherein the specific domain comprises web application development;

determining that a first data object, from among the first set of data objects, is among the plurality of keywords; and in response to determining that the first data object, from among the first set of data objects, is among the plurality of keywords, maintaining the first data object in the second piece of code.

12. The method of claim 8, wherein the expression-to-text map is created by classifying each group of expression syntaxes in different programming languages into a respective class, and wherein each member of a group of expression syntaxes has a common interpretation as other members of the group of expression syntaxes.

13. The method of claim 8, wherein creating, based at least in part upon the first knowledge graph and the determined interpretation of the identified expression syntax, the sentence for the at least one line of the first piece of code, comprises:

for each data object from among the first set of data objects, determining an equivalent text that has a corresponding meaning as the data object; and forming the created sentence by combining the determined equivalent text associated with each data object from among the first set of data objects with the determined interpretation of the identified expression syntax.

14. The method of claim 8, wherein determining, for the plurality of words in the created sentence, the plurality of counterpart data objects in the target programming language, comprises:

accessing a training dataset comprising sample text labeled with a respective data object in the target programming language;

extracting a first set of features from the sample text, wherein the first set of features indicates an interpretation of the sample text, and wherein the first set of features is represented by a first feature vector;

extracting a second set of features from a word in the created sentence, wherein the second set of features indicates an interpretation of the word in the created sentence, and wherein the second set of features is represented by a second feature vector;

comparing the first feature vector with the second feature vector;

determining a distance between the first feature vector and the second feature vector;

comparing the determined distance between the first feature vector and the second feature vector with a threshold distance;

determining that the determined distance is less than the threshold distance; and in response to determining that the determined distance is less than the threshold distance, determining that the respective data object is a counterpart to the word in the created sentence in the target programming language.

15. A non-transitory machine-readable medium storing instructions that, when executed by a processor, cause the processor to:
> store, in a memory, a first piece of code written in an original programming language, wherein the first piece of code is programmed to perform a particular task; an expression-to-text map that comprises a plurality of expression syntaxes mapped to respective text, wherein the respective text indicates an interpretation of the plurality of expression syntaxes; and a syntax rule associated with a target programming language, and wherein the syntax rule indicates how data objects should be assembled to satisfy the syntax rule;
> identify a first set of data objects from the first piece of code, wherein the first set of data objects comprises at least one of a name of a function, a type of the function, an input parameter of the function, a type of the input parameter of the function, an output parameter of the function, or a type of the output parameter of the function;
> create a first knowledge graph that represents a relationship among the first set of data objects, wherein the first knowledge graph is created based at least in part upon a position of each data object from among the first set of data objects with respect to positions of other data objects in the first piece of code;
> identify an expression syntax from the first piece of code;
> determine an interpretation of the identified expression syntax in response to identifying that the identified expression syntax is among the plurality of expression syntaxes in the expression-to-text map, wherein the respective text indicates the determined interpretation of the identified expression syntax;
> create, based at least in part upon the first knowledge graph and the determined interpretation of the identified expression syntax, a sentence for at least one line of the first piece of code, wherein the created sentence indicates an interpretation of the at least one line of the first piece of code;
> determine, for a plurality of words in the created sentence, a plurality of counterpart data objects in the target programming language, wherein each counterpart data object of the plurality of counterpart data objects is determined for a particular word in the plurality of words in the created sentence;
> create a second piece of code in the target programming language based at least in part upon the determined plurality of counterpart data objects and the syntax rule, such that the second piece of code satisfies the syntax rule;
> determine that the second piece of code is configured to perform the particular task; and
> in response to determining that the second piece of code is configured to perform the particular task, execute the second piece of code to perform the particular task.

16. The non-transitory machine-readable medium of claim 15, wherein the instructions that, when executed by the processor, further cause the processor to:
> identify a second set of data objects from the second piece of code;
> determine a relationship among the second set of data objects based at least in part upon a position of each data object in the second piece of code with respect to positions of other data objects from among the second set of data objects;
> create a second knowledge graph that represents the relationship among the second set of data objects; and
> determine that the second piece of code is configured to perform the particular task based at least in part upon the first and second knowledge graphs.

17. The non-transitory machine-readable medium of claim 16, wherein determining that the second piece of code is configured to perform the particular task based at least in part upon the first and second knowledge graphs comprises:
> extracting a first set of features from the first knowledge graph, wherein the first set of features is represented by a first feature vector, and wherein the first set of features indicates a first task flow associated with the first piece of code;
> extracting a second set of features from the second knowledge graph, wherein the second set of features is represented by a second feature vector, and wherein the second set of features indicates a second task flow associated with the second piece of code;
> comparing the first feature vector with the second feature vector;
> determining a distance between the first feature vector and the second feature vector;
> comparing the determined distance between the first feature vector and the second feature vector with a threshold distance; and
> in response to determining that the determined distance between the first feature vector and the second feature vector is less than the threshold distance:
>> determining that the first task flow corresponds to the second task flow; and
>> determining that the second piece of code is configured to perform the particular task.

18. The non-transitory machine-readable medium of claim 15, wherein the instructions that, when executed by the processor, further cause the processor to:
> access a domain-specific dataset comprising a plurality of keywords associated with a specific domain, wherein the specific domain comprises web application development;
> determine that a first data object, from among the first set of data objects, is among the plurality of keywords; and
> in response to determining that the first data object, from among the first set of data objects, is among the plurality of keywords, maintain the first data object in the second piece of code.

19. The non-transitory machine-readable medium of claim 15, wherein the expression-to-text map is created by classifying each group of expression syntaxes in different programming languages into a respective class, and wherein each member of a group of expression syntaxes has a common interpretation as other members of the group of expression syntaxes.

20. The non-transitory machine-readable medium of claim 15, wherein creating, based at least in part upon the first knowledge graph and the determined interpretation of the identified expression syntax, the sentence for the at least one line of the first piece of code, comprises:
> for each data object from among the first set of data objects, determining an equivalent text that has a corresponding meaning as the data object; and
> forming the created sentence by combining the determined equivalent text associated with each data object from among the first set of data objects with the determined interpretation of the identified expression syntax.

* * * * *